US008752263B2

(12) United States Patent
Sorensen

(10) Patent No.: US 8,752,263 B2
(45) Date of Patent: Jun. 17, 2014

(54) POST-TENSION STRAND REPAIR METHOD AND APPARATUS

(76) Inventor: Mark Sorensen, Portland, OR (US)

( * ) Notice: Subject to any disclaimer, the term of this patent is extended or adjusted under 35 U.S.C. 154(b) by 1147 days.

(21) Appl. No.: 12/499,748

(22) Filed: Jul. 8, 2009

(65) Prior Publication Data

US 2010/0005661 A1 Jan. 14, 2010

Related U.S. Application Data

(60) Provisional application No. 61/079,396, filed on Jul. 9, 2008.

(51) Int. Cl.
*B23P 6/00* (2006.01)
*B23P 19/04* (2006.01)

(52) U.S. Cl.
USPC .................... 29/402.09; 29/897.1; 29/897.34; 29/452

(58) Field of Classification Search
USPC ........... 29/452, 244, 267, 446, 897.34, 897.1, 29/268, 278, 281.5, 283, 238, 402.01, 29/402.09, 402.14, 402.15; 254/29 A, 2 B, 254/8 B, 122, 126, 10.5
See application file for complete search history.

(56) References Cited

U.S. PATENT DOCUMENTS

| | | | | | |
|---|---|---|---|---|---|
| 921,973 | A | * | 5/1909 | Gillett et al. | 29/237 |
| 1,234,297 | A | * | 7/1917 | Dean | 254/248 |
| 2,696,040 | A | * | 12/1954 | Crom et al. | 29/452 |
| 3,089,215 | A | * | 5/1963 | Stubbs | 425/111 |
| 3,343,808 | A | * | 9/1967 | Howlett | 254/133 R |
| 4,872,709 | A | * | 10/1989 | Stack | 285/39 |
| 4,893,393 | A | * | 1/1990 | Marshall | 29/237 |
| 4,955,592 | A | | 9/1990 | Brennan, Sr. | |
| 2007/0084668 | A1 | | 4/2007 | Barsoumian | |
| 2010/0258772 | A1 | * | 10/2010 | Parkin | 254/29 A |

FOREIGN PATENT DOCUMENTS

| | | | |
|---|---|---|---|
| EP | 0035424 | A1 | 9/1981 |
| EP | 1994992 | A1 | 11/2008 |
| WO | WO2006010247 | A1 | 2/2006 |

* cited by examiner

*Primary Examiner* — David Bryant
*Assistant Examiner* — Christopher M Koehler
(74) *Attorney, Agent, or Firm* — Schwabe, Williamson & Wyatt, P.C.

(57) ABSTRACT

Embodiments include but are not limited to apparatuses and systems for post-tension strand repair. A post-tension strand repair apparatus may include two or more guiding legs, each guiding leg including a strand guide configured to engage a strand end, wherein the two or more guiding legs are coupled to allow the strand guides to be drawn toward each other and thus urge the strand ends toward each other. Other embodiments may be described.

6 Claims, 7 Drawing Sheets

POST-TENSION STRAND REPAIR METHOD AND APPARATUS

RELATED APPLICATIONS

This application claims priority to U.S. Provisional Patent Application No. 61/079,396, filed Jul. 9, 2008, and entitled "Post-Tension Strand Repair Apparatus," the entire disclosure of which is hereby incorporated by reference in its entirety for all purposes except for those sections, if any, that are inconsistent with this specification.

TECHNICAL FIELD

Embodiments of the invention pertain to apparatuses for post-tension strand repair.

BACKGROUND

Reinforced concrete is a mainstay in the construction of buildings, bridges, and other structures. Although other reinforcement methods exist, post-tensioning has been used in a number of applications. In basic terms, post-tensioning generally involves tensioning of long strands (sometimes referred to in the art as "tendons") after a concrete slab has been poured and set.

It is a fairly common occurrence for the post-tension strands to be severed or otherwise damaged. As the strands are sometimes located relatively close to the surface of a slab, it is not uncommon for a strand to be inadvertently severed, for example, by cutting or sawing into a concrete slab during the course of other repair work, running service lines, etc. A severed strand can mean that the concrete slab is more vulnerable to failure such as cracking or sagging, which in the worst case could mean failure of the entire structure.

Repairing severed or damaged post-tension strands typically is a highly-complex, difficult and time intensive operation. To repair severed strands, a large section of the concrete slab must be first jack-hammered to form an opening exposing significant lengths of the broken ends of a strand. An additional strand section is coupled to one of the broken strands, and then the end of the additional strand section and the end of the other broken strand are fed through at least one bowtie anchor. Tension is then applied at each end of the bowtie anchor.

Current methods for repairing post-tension strands are undesirable for a number of reasons. For example, during the re-tensioning operation, care must be taken to limit the position and amount the bowtie coupler and/or strand twists so as to avoid protrusion of the bowtie coupler and/or strand above the surface of the concrete slab. If the bowtie coupler and/or strand ends up protruding above the surface of the concrete slab, resurfacing of the slab may be difficult and/or may produce inferior results.

Additionally, a relatively large area and depth of the concrete slab must be opened up to give the post-tension jacks enough surface against which to press while tensioning the strands. Moreover, in some situations, the concrete slab must be further reinforced to withstand the pressure encountered during the tensioning operation. These steps result in additional time, cost, and difficulty of the repair operation.

DRAWINGS

Embodiments of the present invention will be readily understood by the written description along with reference to the accompanying drawings. Embodiments of the invention are illustrated by way of example and not by way of limitation in the accompanying drawings.

DETAILED DESCRIPTION OF EMBODIMENTS OF THE INVENTION

Figure 1:
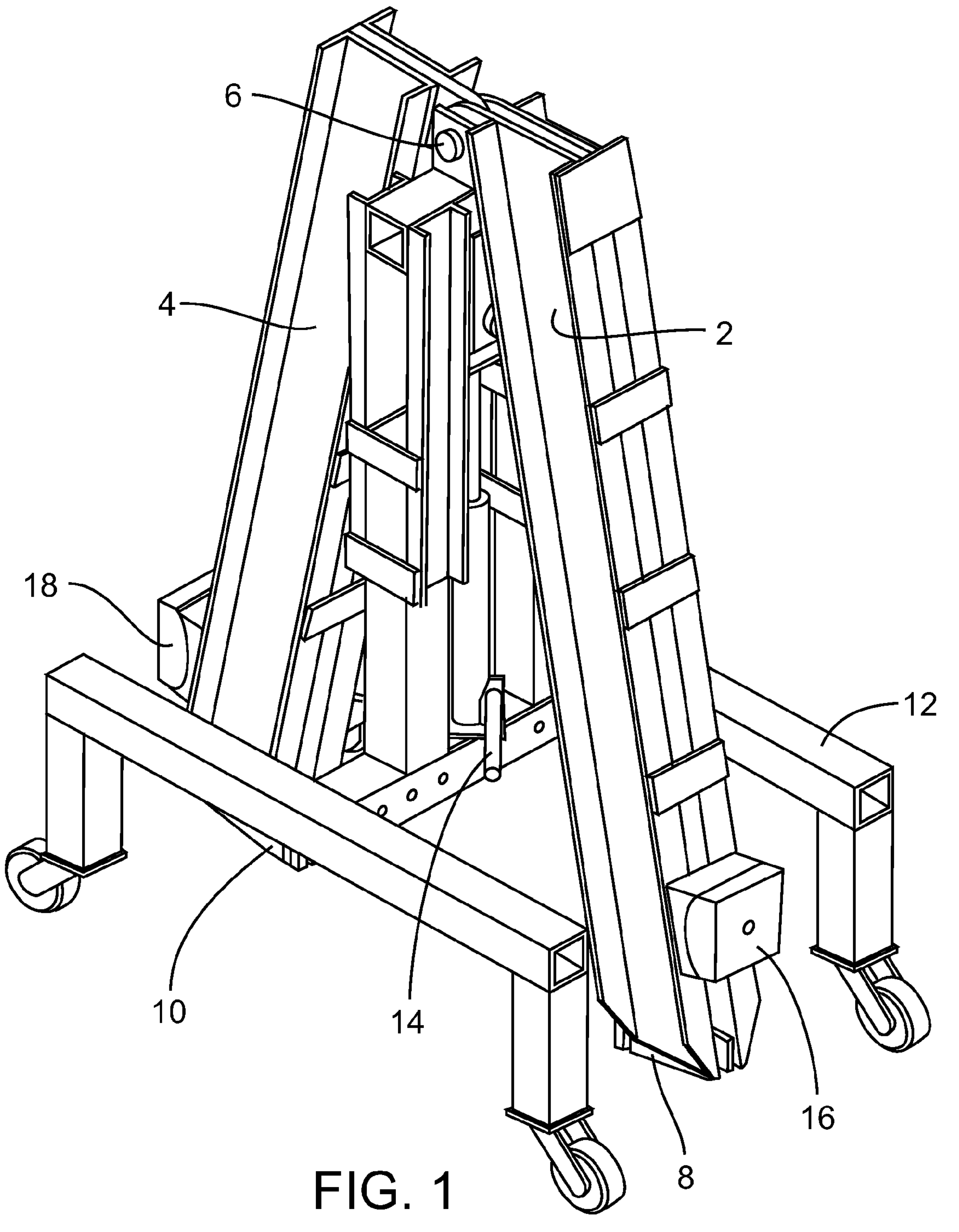
FIG. 1 is a perspective view of a post-tension strand repair apparatus in accordance with various embodiments of the present invention.

In the following detailed description, reference is made to the accompanying drawings which form a part hereof wherein like numerals if illustrated designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)", that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention may include post-tension strand repair apparatuses, methods, and systems. In various embodiments, a post-tension strand repair apparatus may comprise legs arranged to pivot at least in part about an axis positioned above the area of repair, and strand guides disposed on each of the legs to allow strand ends to pass therethrough. A one-way donut or other coupler may be attached to each of the strand ends to prevent the strand ends slipping out of the guides. By articulating the legs toward each other about the axis, the strand ends may be drawn together and may be coupled by way of a coupler.

Figure 2:
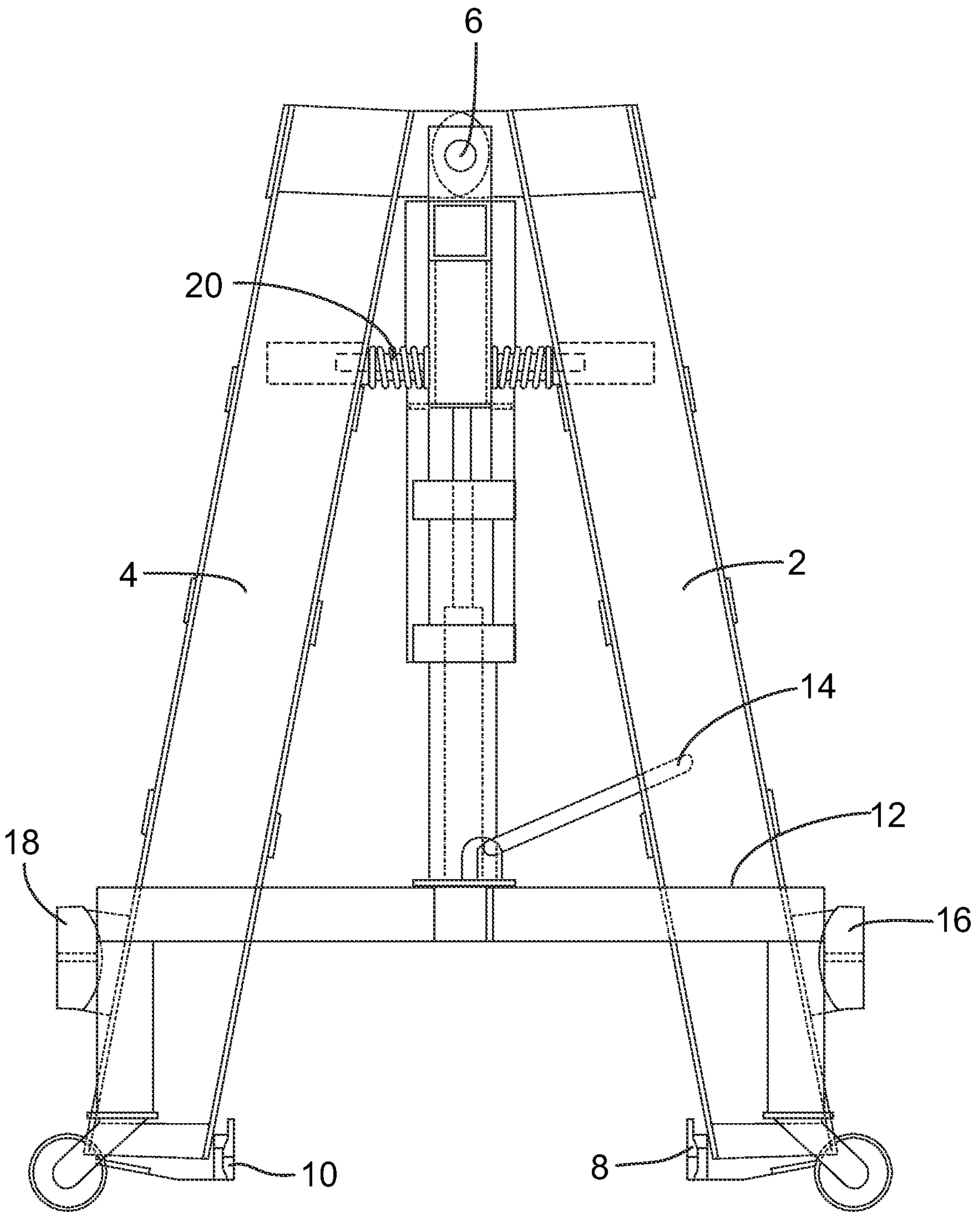
FIG. 2 is a front view of the post-tension strand repair apparatus of FIG. 1.
Figure 3:
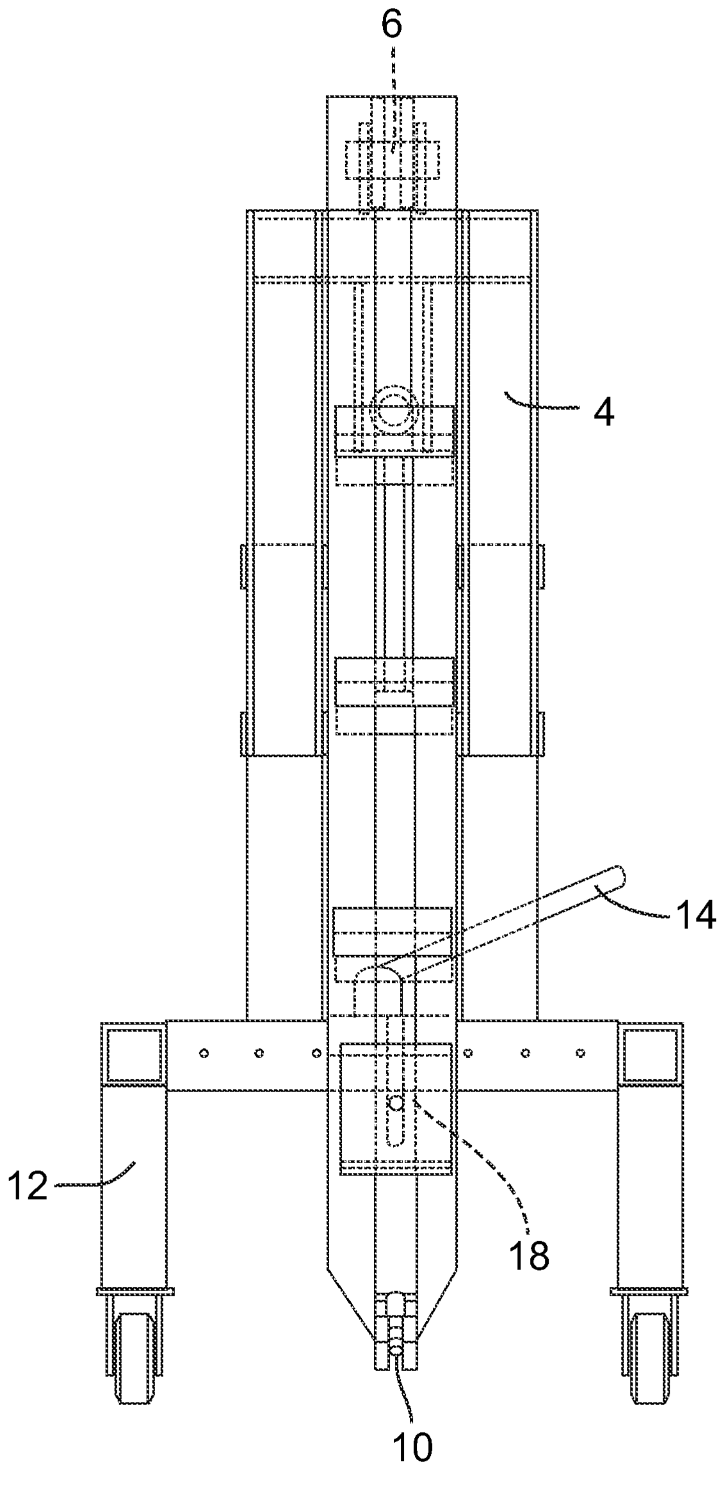
FIG. 3 is a side view of the post-tension strand repair apparatus of FIG. 1.
Figure 4:
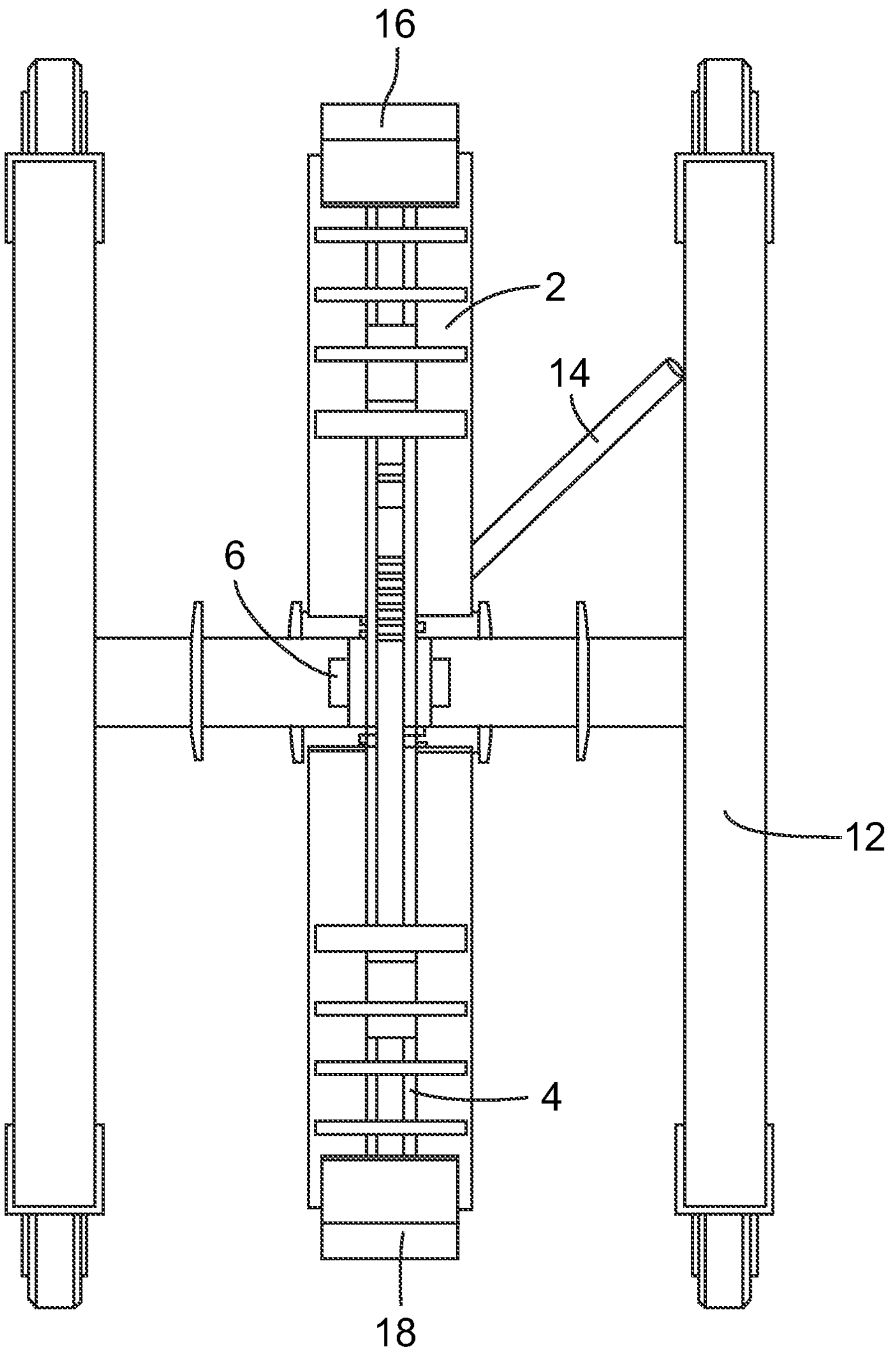
FIG. 4 is a top view of the post-tension strand repair apparatus of FIG. 1.

FIG. 1 is a perspective view of an exemplary post-tension strand repair apparatus in accordance with various embodiments of the present invention. A side view of the apparatus is illustrated at FIG. 2. A side view and top view are illustrated at FIG. 3 and FIG. 4, respectively.

In the illustrated example embodiment, the apparatus includes two guiding legs 2, 4 arranged in a generally A-frame configuration, each of the guiding legs 2, 4 being configured to pivot at least in part about an axis 6. In various other embodiments, the guiding legs 2, 4 may be arranged in a different manner. For example, the guiding legs 2, 4 may take on a X-shaped configuration. In still further embodiments, the guiding legs 2, 4 may be arranged substantially parallel to each other. In these embodiments, the apparatus may exclude axis 6 in lieu of a track or other guide mechanism for guiding the guiding legs 2, 4 toward each other during a re-tensioning operation. In various embodiments, more than two guiding legs/members may be used.

A strand guide 8, 10 is disposed on each of the guiding legs 2, 4 to allow a strand end to pass through each of the strand guides 8, 10. The strand guides 8, 10 may take on any configuration suitable for the purpose as those skilled in the art may appreciate. In various embodiments, the strand guides 8, 10 may be a generally inverted U-shape so as to be able to straddle or cradle a strand while allowing the strand to pass therethrough. In various embodiments, the strand guides 8, 10 may be sized to accommodate various strand diameters including, but not limited to conventionally-used 0.5 inch- or 0.6 inch-diameter strands. Further the geometrical configuration of the strand guides may be selected based on a variety of factors, including, but not limited to strand size and geometrical cross section. Further, in various embodiments, the guides may have one-way gripping members adapted to grip the strands as the ends are pulled towards each other.

In various embodiments, and as illustrated, the guiding legs 2, 4 may be mounted, permanently or removably, onto a cart 12 to allow for transport and/or structural support for the apparatus. The cart 12 may have wheels to allow mobility of the apparatus, which may help with apparatus transport, fine positioning of the apparatus above the repair area, and/or tension relieving movement of the device during the repair process. In various embodiments, the apparatus may include other mobility systems and/or exclude such wheels altogether.

Figure 5:
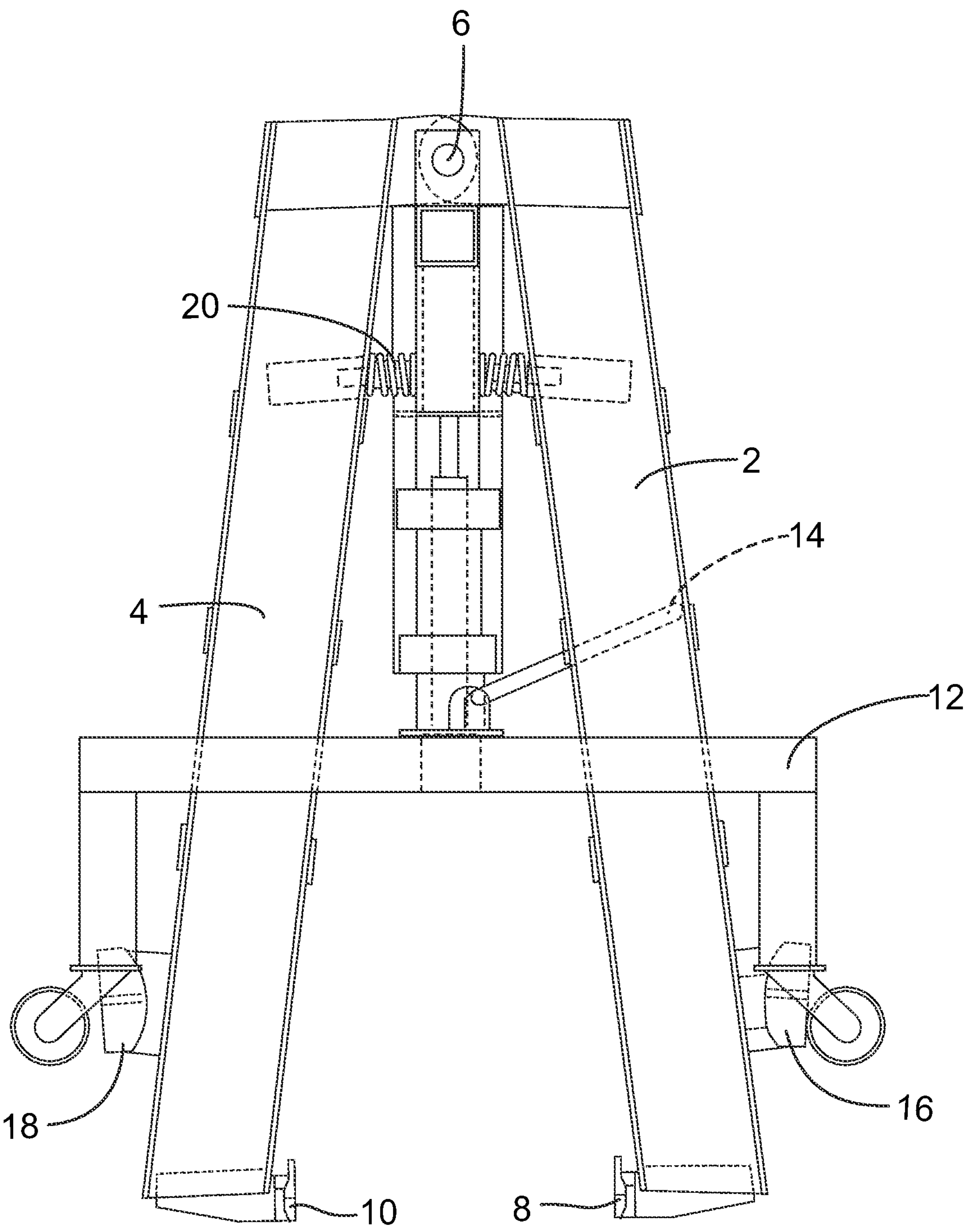
FIG. 5 is another front view of the post-tension strand repair apparatus of FIG. 1.

In various embodiments, the height or position of the guiding legs 2, 4 may be adjusted to allow for versatility of the apparatus and to accommodate varying depths of post-tension strands needing repair. For instance, a post-tension strand may be located relatively deep within a concrete slab in which case the guiding legs 2, 4 would need to be lowered sufficiently to engage and act on the strand ends. In various embodiments the cart 12 may include a jack mechanism 14 for lowering and raising the guiding legs 2, 4 as needed. As illustrated at FIG. 5, for example, the guiding legs 2, 4 are in a lowered position.

In various embodiments, the post-tension repair apparatus may include a biasing element 20 for biasing the guiding legs 2, 4 to an open position. Such biasing may be desirable for placing the guiding legs 2, 4 in their widest position to allow for pulling strand ends through the strand guides 8, 10. In various embodiments, the biasing element 20 may be adjustable in tension and/or position to help best accommodate positioning of the apparatus. The biasing element 20 may be a spring, elastomer, or other resilient member. Other materials/devices may be similarly suitable for providing a biasing force.

Figure 6:
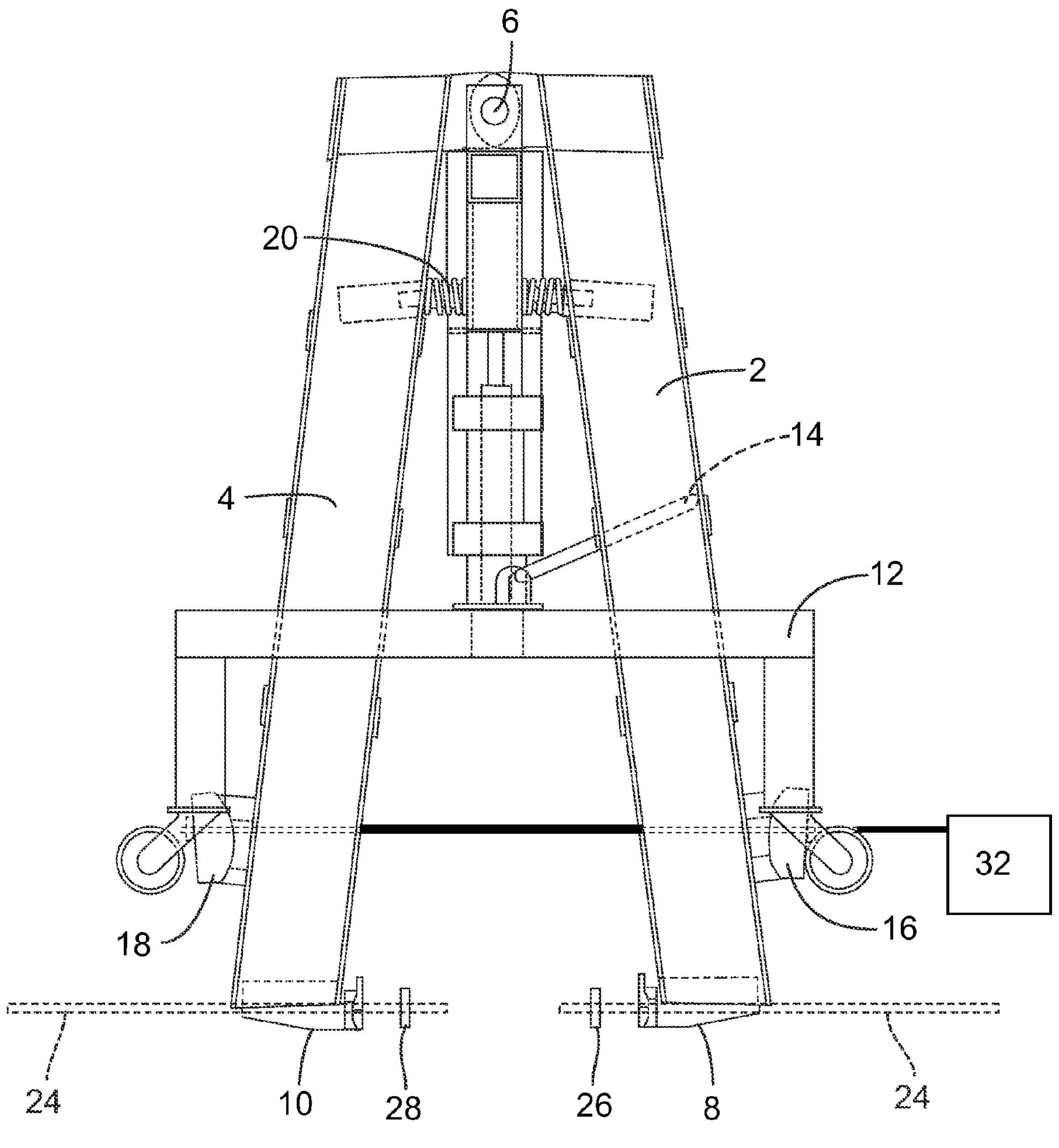
FIG. 6 and FIG. 7 illustrate an exemplary operation of a post-tension strand repair apparatus (such as, for example, the post-tension strand repair apparatus of FIG. 5) in accordance with various embodiments of the present invention.
Figure 7:
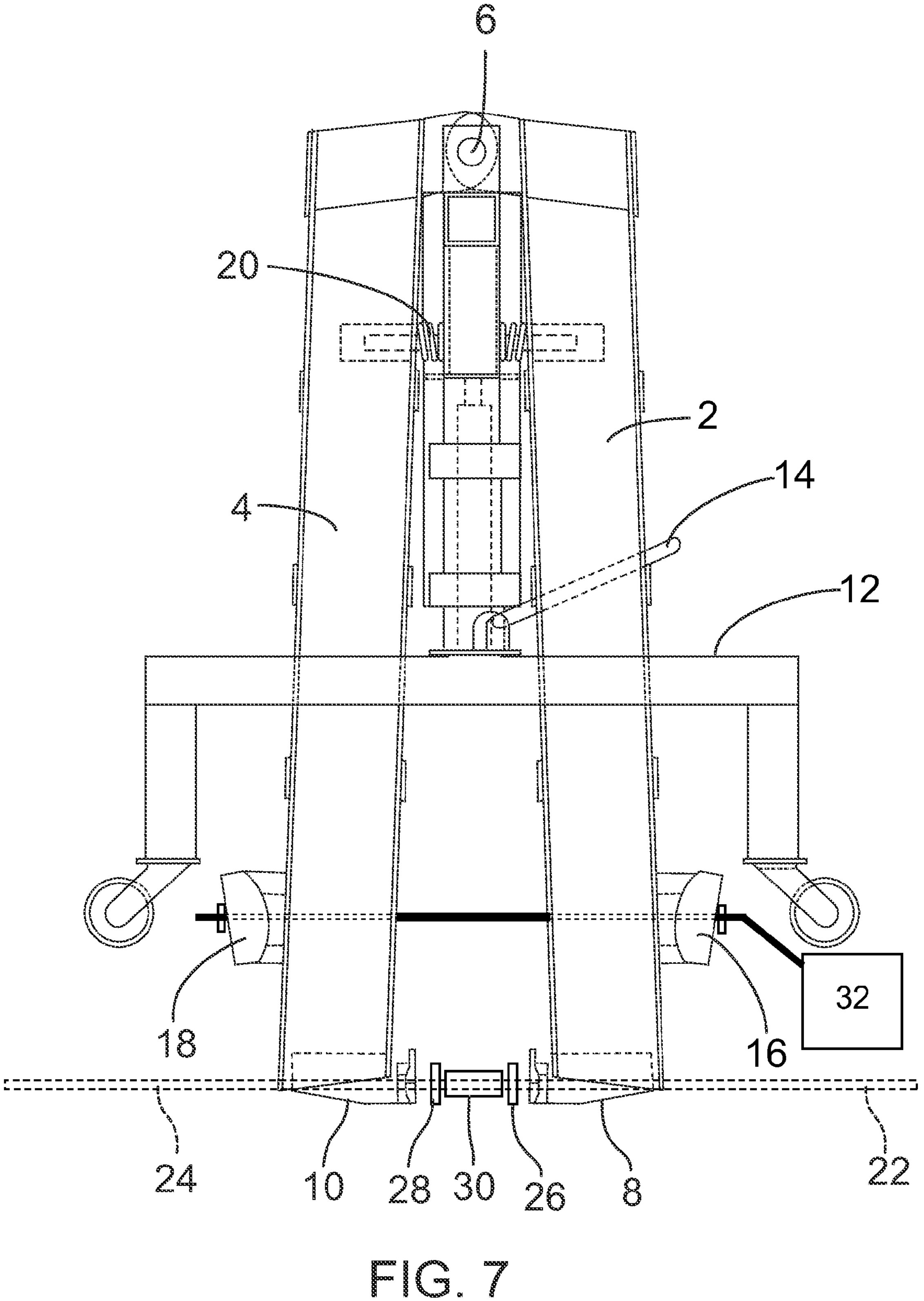

FIG. 6 and FIG. 7 illustrate an exemplary operation of a post-tension strand repair apparatus in accordance with various embodiments of the present invention. As noted herein, when the guiding legs 2, 4 are articulated together, strand ends may be drawn toward each other to allow for coupling of the strand ends. For articulating the guiding legs 2, 4, a tensioning device 32 such as a post-tensioning jack or other suitable jack may be coupled, permanently or removably, to one of the guiding legs 2, 4 at one or more connection points 16, 18. In various other embodiments, however, more than two post-tensioning tensioning devices 32 may be used, for example, one on each of the connections points 16, 18. Although any number of tensioning devices 32 known in the art may be suitable for practicing the subject invention, in various embodiments, the tensioning device 32 may be a 50-ton post-tensioning bar jack. Other tensioning capacities may be similarly suitable.

Illustrated at FIG. 6 is an exemplary operation in which the tensioning device 32 comprises a post-tensioning jack. As illustrated, strands 22, 24 are fed through the strand guides 8, 10. A one-way donut 26,28 may be attached to ends of each of the strands 22, 24 to prevent the strands 22, 24 from slipping out of the guides 8,10. In various embodiments, the guides 8,10 may be configured to provide one way gripping of the strand ends (e.g. tapered profile and/or rolling gripping members).

A bar, strand, or other tension member 34 may be passed through one of the connection points 16, 18 and fed through the other one of the connection points 16, 18. A one-way donut 36, wedge, or other coupler may be affixed to the end of the tension member 34 for ensuring that the member 34 does not retract through the connection points 16, 18.

As illustrated at FIG. 7, the tensioning device 32 may then pull or otherwise retract the tension member 34, and since the one-way donut 36 prevents the end of the bar or strand 34 from retracting through the connection points 16, 18, the guiding legs 2, 4 are caused to articulate toward each other. By articulating legs 2, 4 toward each other, the strands 22, 24 may be drawn together and may be coupled by way of a coupler 30.

After the strands 22, 24 are coupled (i.e., re-tensioned), the post-tension repair apparatus may be moved away. To move the apparatus away, the jack mechanism 14 of the cart 12 may operate to raise the guiding legs 2, 4. Once the guiding legs 2, 4 are raised to a sufficient height to clear the hole in which the strands 22, 24 are located, the apparatus may be pushed or otherwise moved away.

In various embodiments, the connection points 16, 18 and/or the strand guides 8, 10 may be configured to rotate or move as necessary to allow a post-tension jack, strands, or the post-tension repair apparatus to shift as needed during a re-tensioning operation. In some embodiments, one or both of the connection points 16, 18 and/or one or both of the strand guides 8, 10 may include a ball-and-socket-type configuration for this purpose.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for repairing post-tension strands, comprising:

prior to engaging a first strand end with a first strand guide and prior to engaging a second strand end with a second strand guide, lowering a first guiding leg and a second guiding leg into a cavity containing the first strand end and the second strand end while a cart coupled with the first guiding leg and the second guiding leg remains outside the cavity;

engaging the first strand end with the first strand guide of the first guiding leg;

engaging the second strand end with the second strand guide of the second guiding leg, wherein the first guiding leg and the second guiding leg are coupled at an axis, the first and second guiding legs configured to articulate about the axis;

drawing the first guiding leg having the first strand end engaged therewith and the second guiding leg having the second strand engaged therewith toward each other, wherein drawing the first strand guide and the second strand guide toward each other comprises articulating the first guiding leg and the second guiding leg about the axis; and when the first guiding leg and the second guiding leg are drawn toward each other, coupling the first strand end to the second strand end.

2. The method of claim 1, wherein the first strand end is engaged with the first strand guide using a first one-way donut, and wherein the second strand end is engaged with the second strand guide using a second one-way donut.

3. The method of claim 1, wherein the first strand guide and the second strand guide are drawn toward each other using a tensioning device.

4. The method of claim 1, wherein the first strand end and the second strand end are coupled using a coupler.

5. The method of claim 1, wherein the first strand guide is configured to provide a one way grip of the first strand end, and the second strand guide is configured to provide a one way grip of the second strand end.

6. The method of claim 5, wherein the first strand guide is configured to provide a one way grip of the first strand end using a tapered profile or a first rolling gripping member, and the second strand guide is configured to provide a one way grip of the second strand end using a tapered profile or a second rolling gripping member.

* * * * *